US010104420B2

(12) United States Patent
Casagrande

(10) Patent No.: US 10,104,420 B2
(45) Date of Patent: *Oct. 16, 2018

(54) AUTOMATICALLY RECORDING SUPPLEMENTAL CONTENT

(71) Applicant: DISH Technologies L.L.C., Englewood, CO (US)

(72) Inventor: Steven Michael Casagrande, Castle Pines, CO (US)

(73) Assignee: DISH Technologies, L.L.C., Englewood, CO (US)

( * ) Notice: Subject to any disclaimer, the term of this patent is extended or adjusted under 35 U.S.C. 154(b) by 454 days.

This patent is subject to a terminal disclaimer.

(21) Appl. No.: 14/880,934

(22) Filed: Oct. 12, 2015

(65) Prior Publication Data
US 2016/0080800 A1 Mar. 17, 2016

Related U.S. Application Data

(63) Continuation of application No. 13/888,012, filed on May 6, 2013, now Pat. No. 9,191,694, which is a (Continued)

(51) Int. Cl.
H04N 5/76 (2006.01)
H04N 21/433 (2011.01)
(Continued)

(52) U.S. Cl.
CPC ........... *H04N 21/4334* (2013.01); *H04N 5/76* (2013.01); *H04N 9/8227* (2013.01);
(Continued)

(58) Field of Classification Search
CPC ............. H04N 9/8227; H04N 21/8133; H04N 21/4334; H04N 21/8549; H04N 21/6143;
(Continued)

(56) References Cited

U.S. PATENT DOCUMENTS 4,706,121 A  11/1987 Young
4,723,246 A   2/1988 Weldon, Jr.
(Continued)

FOREIGN PATENT DOCUMENTS

CN  1595975 A  3/2005
CN  1615017 A  5/2005
(Continued)

OTHER PUBLICATIONS

Publication of Brazil appln No. BR 11 2013 031100-2 dated Jun. 6, 2017, 1 page.
(Continued)

Primary Examiner — Robert Chevalier
(74) Attorney, Agent, or Firm — Kilpatrick Townsend & Stockton, LLP

(57) ABSTRACT

A content provider transmits instructions to a content receiver to record multiple instances of content. The instances of content are included in the same frequency band of a broadcast transmitted by the content provider via a first communication link and scrambled utilizing the same control word. The content provider determines to supplement the multiple instances of content and transmits an instruction to record a supplemental instance of content from a second content provider via a second communication link. The content receiver receives the instructions and accordingly receives, descrambles, and stores the multiple instances of content and the supplemental instance of content. In some implementations, the first communication link may be a satellite communication link and the second communication link may be a different type of communication link such as a terrestrial broadcast communication link and/or an Internet protocol communication link.

20 Claims, 4 Drawing Sheets

Related U.S. Application Data continuation of application No. 13/215,702, filed on Aug. 23, 2011, now Pat. No. 8,447,170.

(51) Int. Cl.

| | | |
|---|---|---|
| *H04N 9/82* | (2006.01) | |
| *H04N 21/81* | (2011.01) | |
| *H04N 21/8549* | (2011.01) | |
| *H04N 21/231* | (2011.01) | |
| *H04N 21/426* | (2011.01) | |
| *H04N 21/61* | (2011.01) | |
| *H04N 21/6543* | (2011.01) | |
| *H04N 21/858* | (2011.01) | |

(52) U.S. Cl.
CPC ... *H04N 21/23113* (2013.01); *H04N 21/4263* (2013.01); *H04N 21/6125* (2013.01); *H04N 21/6143* (2013.01); *H04N 21/6543* (2013.01); *H04N 21/8133* (2013.01); *H04N 21/858* (2013.01); *H04N 21/8549* (2013.01)

(58) Field of Classification Search
CPC ........... H04N 21/6125; H04N 21/4263; H04N 21/23113; H04N 21/6543; H04N 21/858; H04N 5/76
USPC ................ 386/296, 291, 297, 298, 323, 326
See application file for complete search history.

(56) References Cited

U.S. PATENT DOCUMENTS

| | | |
|---|---|---|
| 4,802,215 A | 1/1989 | Mason |
| 5,187,589 A | 2/1993 | Kono et al. |
| 5,335,277 A | 8/1994 | Harvey et al. |
| 5,483,277 A | 1/1996 | Granger |
| 5,488,658 A | 1/1996 | Hirashima |
| 5,541,738 A | 7/1996 | Mankovitz |
| 5,608,652 A | 3/1997 | Astle |
| 5,642,153 A | 6/1997 | Chaney et al. |
| 5,682,597 A | 10/1997 | Ganek et al. |
| 5,684,969 A | 11/1997 | Ishida |
| 5,724,646 A | 3/1998 | Ganek et al. |
| 5,805,763 A | 9/1998 | Lawler et al. |
| 5,974,218 A | 10/1999 | Nagasaka et al. |
| 6,049,333 A | 4/2000 | LaJoie et al. |
| 6,263,504 B1 | 7/2001 | Ebisawa |
| 6,351,474 B1 | 2/2002 | Robinett et al. |
| 6,453,115 B1 | 9/2002 | Boyle |
| 6,628,891 B1 | 9/2003 | Vantalon et al. |
| 6,687,296 B1 | 2/2004 | Sato et al. |
| 6,701,528 B1 | 3/2004 | Arsenault et al. |
| 6,728,883 B1 | 4/2004 | Kohashi et al. |
| 6,766,523 B2 | 7/2004 | Herley |
| 6,771,703 B1 | 8/2004 | Oguz et al. |
| 6,798,971 B2 | 9/2004 | Potrebic |
| 6,938,208 B2 | 8/2005 | Reichardt |
| 7,024,676 B1 | 4/2006 | Klopfenstein |
| 7,062,048 B2 | 6/2006 | Livaditis et al. |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,505,081 B2 | 3/2009 | Eshleman |
| 7,533,402 B2 | 5/2009 | Demas et al. |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,684,672 B2 | 3/2010 | Matoba |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,804,861 B2 | 9/2010 | Kim |
| 7,848,618 B2 | 12/2010 | Potrebic et al. |
| 7,856,557 B2 | 12/2010 | Beuque |
| 7,925,141 B2 | 4/2011 | Geer et al. |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,006,268 B2 | 8/2011 | Sloo |
| 8,201,194 B2 | 6/2012 | Wijnands et al. |
| 8,321,466 B2 | 11/2012 | Black et al. |
| 8,364,671 B1 | 1/2013 | Sinton et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 8,763,027 B2 | 6/2014 | Martch |
| 8,774,608 B2 | 7/2014 | Kummer et al. |
| 8,819,722 B2 | 8/2014 | Kummer et al. |
| 8,819,761 B2 | 8/2014 | Minnick |
| 8,850,476 B2 | 9/2014 | VanDuyn et al. |
| 8,867,893 B2 | 10/2014 | Kirby |
| 8,959,544 B2 | 2/2015 | Kummer et al. |
| 8,959,566 B2 | 2/2015 | Kummer |
| 8,989,562 B2 | 3/2015 | Kummer et al. |
| 8,997,153 B2 | 3/2015 | Templeman |
| 9,031,385 B2 | 5/2015 | Casagrande et al. |
| 9,043,843 B2 | 5/2015 | Templeman et al. |
| 9,055,274 B2 | 6/2015 | Casagrande |
| 9,088,763 B2 | 7/2015 | Martch et al. |
| 9,113,222 B2 | 8/2015 | VanDuyn |
| 9,177,605 B2 | 11/2015 | Minnick et al. |
| 9,177,606 B2 | 11/2015 | Kirby |
| 9,185,331 B2 | 11/2015 | Martch et al. |
| 9,191,694 B2 | 11/2015 | Casagrande |
| 9,202,524 B2 | 12/2015 | Martch et al. |
| 9,264,779 B2 | 2/2016 | Kirby et al. |
| 9,269,397 B2 | 2/2016 | Casagrande et al. |
| 9,349,412 B2 | 5/2016 | Templeman |
| 9,350,937 B2 | 5/2016 | Kummer et al. |
| 9,357,159 B2 | 5/2016 | Martch et al. |
| 9,361,940 B2 | 6/2016 | Minnick |
| 9,412,413 B2 | 8/2016 | Martch |
| 9,489,981 B2 | 11/2016 | Templeman et al. |
| 9,489,982 B2 | 11/2016 | Casagrande et al. |
| 9,521,440 B2 | 12/2016 | Kummer et al. |
| 9,549,213 B2 | 1/2017 | Templeman et al. |
| 9,621,946 B2 | 4/2017 | Kennedy |
| 9,628,838 B2 | 4/2017 | Kummer et al. |
| 9,635,436 B2 | 4/2017 | Casagrande |
| 9,756,378 B2 | 9/2017 | Hardy |
| 9,781,464 B2 | 10/2017 | Templeman |
| 9,894,406 B2 | 2/2018 | Martch et al. |
| 9,918,116 B2 | 3/2018 | Robinson |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2002/0044658 A1 | 4/2002 | Wasilewski et al. |
| 2002/0054752 A1 | 5/2002 | Wood et al. |
| 2002/0055343 A1 | 5/2002 | Stetzler et al. |
| 2002/0087979 A1 | 7/2002 | Dudkiewicz et al. |
| 2002/0087983 A1 | 7/2002 | Son et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0116705 A1 | 8/2002 | Perlman |
| 2002/0120925 A1 | 8/2002 | Logan |
| 2002/0126221 A1 | 9/2002 | Link |
| 2002/0141431 A1 | 10/2002 | Tripathy |
| 2002/0144259 A1 | 10/2002 | Gutta et al. |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0174430 A1 | 11/2002 | Ellis et al. |
| 2002/0184638 A1 | 12/2002 | Agnihotri et al. |
| 2002/0188943 A1 | 12/2002 | Freeman et al. |
| 2003/0005454 A1 | 1/2003 | Rodriguez et al. |
| 2003/0026423 A1 | 2/2003 | Unger et al. |

(56) References Cited

U.S. PATENT DOCUMENTS

| | | |
|---|---|---|
| 2003/0078930 A1 | 4/2003 | Surcouf et al. |
| 2003/0097659 A1 | 5/2003 | Goldman |
| 2003/0110514 A1 | 6/2003 | West et al. |
| 2003/0149988 A1 | 8/2003 | Ellis et al. |
| 2003/0152360 A1 | 8/2003 | Mukai et al. |
| 2003/0156826 A1 | 8/2003 | Sonoda et al. |
| 2003/0177492 A1 | 9/2003 | Kanou |
| 2003/0177495 A1 | 9/2003 | Needham et al. |
| 2003/0200548 A1 | 10/2003 | Baran et al. |
| 2003/0208763 A1 | 11/2003 | McElhatten et al. |
| 2003/0208767 A1 | 11/2003 | Williamson et al. |
| 2003/0226150 A1 | 12/2003 | Berberet et al. |
| 2004/0001087 A1 | 1/2004 | Warmus et al. |
| 2004/0003118 A1 | 1/2004 | Brown et al. |
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0080672 A1 | 4/2004 | Kessler et al. |
| 2004/0103428 A1 | 5/2004 | Seok et al. |
| 2004/0128682 A1 | 7/2004 | Liga et al. |
| 2004/0133923 A1 | 7/2004 | Watson et al. |
| 2004/0148501 A1 | 7/2004 | Livaditis et al. |
| 2004/0162871 A1 | 8/2004 | Pabla et al. |
| 2004/0218905 A1 | 11/2004 | Green et al. |
| 2004/0242150 A1 | 12/2004 | Wright et al. |
| 2004/0268387 A1 | 12/2004 | Wendling |
| 2005/0002640 A1 | 1/2005 | Putterman et al. |
| 2005/0034171 A1 | 2/2005 | Benya |
| 2005/0071877 A1 | 3/2005 | Navarro |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0144646 A1 | 6/2005 | Lecrom et al. |
| 2005/0147383 A1 | 7/2005 | Ihara |
| 2005/0180568 A1 | 8/2005 | Krause |
| 2005/0229213 A1 | 10/2005 | Ellis et al. |
| 2005/0237435 A1 | 10/2005 | Potrebic et al. |
| 2005/0267656 A1 | 12/2005 | Dabrowski |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2006/0010464 A1 | 1/2006 | Azami |
| 2006/0020962 A1 | 1/2006 | Stark et al. |
| 2006/0056800 A1 | 3/2006 | Shimagami et al. |
| 2006/0075434 A1 | 4/2006 | Chaney et al. |
| 2006/0078055 A1 | 4/2006 | Kanazawa |
| 2006/0080716 A1 | 4/2006 | Nishikawa et al. |
| 2006/0085828 A1 | 4/2006 | Dureau et al. |
| 2006/0120523 A1 | 6/2006 | Kurotaki |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0257099 A1 | 11/2006 | Potrebic et al. |
| 2006/0274208 A1 | 12/2006 | Pedlow, Jr. |
| 2007/0016546 A1 | 1/2007 | De Vorchik et al. |
| 2007/0019930 A1 | 1/2007 | Kim |
| 2007/0039032 A1 | 2/2007 | Goldey et al. |
| 2007/0061378 A1 | 3/2007 | Lee et al. |
| 2007/0154163 A1 | 7/2007 | Cordray |
| 2007/0157248 A1 | 7/2007 | Ellis |
| 2007/0157253 A1 | 7/2007 | Ellis et al. |
| 2007/0165855 A1 | 7/2007 | Inui |
| 2007/0183745 A1 | 8/2007 | White |
| 2007/0192586 A1 | 8/2007 | McNeely |
| 2007/0204288 A1 | 8/2007 | Candelore |
| 2007/0234395 A1 | 10/2007 | Dureau et al. |
| 2007/0250856 A1 | 10/2007 | Leavens et al. |
| 2007/0258596 A1 | 11/2007 | Kahn et al. |
| 2007/0299976 A1 | 12/2007 | Zafar et al. |
| 2007/0300250 A1* | 12/2007 | Smith .................. H04H 20/31 725/20 |
| 2008/0022347 A1 | 1/2008 | Cohen |
| 2008/0044158 A1 | 2/2008 | Kido |
| 2008/0046929 A1 | 2/2008 | Cho et al. |
| 2008/0052743 A1 | 2/2008 | Moore |
| 2008/0074547 A1 | 3/2008 | Ida |
| 2008/0092164 A1 | 4/2008 | Agarwal et al. |
| 2008/0092181 A1 | 4/2008 | Britt |
| 2008/0101760 A1 | 5/2008 | Waller |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0273856 A1 | 11/2008 | Bumgardner |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1 | 5/2009 | Aisu et al. |
| 2009/0150941 A1 | 6/2009 | Riedl et al. |
| 2009/0158370 A1 | 6/2009 | Li et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2009/0320084 A1 | 12/2009 | Azam et al. |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0138865 A1 | 6/2010 | Rai et al. |
| 2010/0146581 A1 | 6/2010 | Erk |
| 2010/0158479 A1 | 6/2010 | Craner |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0232604 A1 | 9/2010 | Eklund, II |
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0272419 A1 | 10/2010 | Wang et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319037 A1 | 12/2010 | Kim |

(56) References Cited

U.S. PATENT DOCUMENTS

| | | |
|---|---|---|
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0008024 A1 | 1/2011 | Sasaki et al. |
| 2011/0043652 A1 | 2/2011 | King et al. |
| 2011/0078750 A1 | 3/2011 | Tam et al. |
| 2011/0080529 A1 | 4/2011 | Wong |
| 2011/0099364 A1 | 4/2011 | Robyr et al. |
| 2011/0106744 A1 | 5/2011 | Becker et al. |
| 2011/0131413 A1 | 6/2011 | Moon et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0235701 A1 | 9/2011 | Kim et al. |
| 2011/0239249 A1 | 9/2011 | Murison et al. |
| 2011/0255002 A1 | 10/2011 | Witheiler |
| 2011/0286719 A1 | 11/2011 | Woods |
| 2011/0311045 A1 | 12/2011 | Candelore et al. |
| 2012/0183276 A1 | 7/2012 | Quan et al. |
| 2012/0195433 A1 | 8/2012 | Eppolito et al. |
| 2012/0198317 A1 | 8/2012 | Eppolito et al. |
| 2012/0198501 A1 | 8/2012 | Ruan et al. |
| 2012/0236933 A1 | 9/2012 | Saitoh |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | Van Duyn |
| 2012/0331494 A1 | 12/2012 | Pontual et al. |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0081098 A1 | 3/2013 | Klughart |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0115636 A1 | 4/2014 | Stuckman |
| 2014/0126889 A1 | 5/2014 | Kummer et al. |
| 2014/0130094 A1 | 5/2014 | Kirby et al. |
| 2014/0147102 A1 | 5/2014 | Shartzer et al. |
| 2014/0201767 A1 | 7/2014 | Seiden et al. |
| 2014/0341377 A1 | 11/2014 | Kummer et al. |
| 2014/0344858 A1 | 11/2014 | Minnick |
| 2014/0363139 A1 | 12/2014 | Kirby |
| 2014/0376884 A1 | 12/2014 | Lovell |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Protrebic |
| 2015/0245113 A1 | 8/2015 | Casagrande |
| 2015/0319400 A1 | 11/2015 | Golyshko |
| 2016/0073144 A1 | 3/2016 | Robinson |
| 2016/0105711 A1 | 4/2016 | Martch et al. |
| 2016/0134926 A1 | 5/2016 | Casagrande et al. |
| 2016/0198215 A1 | 7/2016 | Hardy |
| 2016/0234543 A1 | 8/2016 | Templeman |
| 2016/0249089 A1 | 8/2016 | Minnick |
| 2016/0323632 A1 | 11/2016 | Martch et al. |

FOREIGN PATENT DOCUMENTS

| | | |
|---|---|---|
| CN | 1926793 A | 3/2007 |
| CN | 101174946 A | 5/2008 |
| CN | 101202600 A | 6/2008 |
| CN | 101310532 A | 11/2008 |
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1 168 347 A | 2/2002 |
| EP | 1372339 A2 | 12/2003 |
| EP | 1 447 983 A1 | 8/2004 |
| EP | 1 667 452 B1 | 7/2006 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 2 541 929 A1 | 1/2013 |
| EP | 2 826 197 A1 | 1/2015 |
| EP | 2 826 238 A1 | 1/2015 |
| GB | 2 459 705 A | 11/2009 |
| IN | 9740/CHENP/2013 A | 9/2014 |
| IN | 7408/CHENP/2014 A | 1/2016 |
| IN | 9493/CHEN/2013 A | 6/2016 |
| JP | 2007 116525 A | 5/2007 |
| JP | 2010165058 A | 7/2010 |
| WO | 98/12872 A1 | 3/1998 |
| WO | 01/24532 A1 | 4/2001 |
| WO | 02/41625 A1 | 5/2002 |
| WO | 2004/057610 A1 | 8/2004 |
| WO | 2007/047410 A2 | 4/2007 |
| WO | 2008/010118 A1 | 1/2008 |
| WO | 2008/010689 A1 | 1/2008 |
| WO | 2008/060486 A2 | 5/2008 |
| WO | 2011/081729 A1 | 7/2011 |
| WO | 2011/027236 A1 | 10/2011 |
| WO | 2012/003693 A1 | 1/2012 |
| WO | 2013/028824 A2 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |
| WO | 2016/066443 A1 | 5/2016 |
| WO | 2016/111817 A1 | 7/2016 |

OTHER PUBLICATIONS

U.S. Appl. No. 15/143,999, filed May 2, 2016, Non-Final Rejection dated Apr. 20, 2017, all pages.

U.S. Appl. No. 15/131,868, filed Apr. 18, 2016 Notice of Allowance dated Jun. 16, 2017, all pages.

(56) References Cited

OTHER PUBLICATIONS

Notice of Publication for BR 11 2014 020064-5 A2 dated Jun. 20, 2017, 1 page.
Second Office Action for CN Appln No. 201380014409.2 dated Jun. 7, 2017, all pages.
Second Office Action from the State Intellectual Property Office (SIPO) for CN 201280031150.8, dated Mar. 27, 2017, all pages.
Office Action for EP 128254745 dated Aug. 4, 2017, all pages.
Wikipedia: "MPEG-2 Transmission", Internet Citation, Jan. 31, 2001, pp. 1-9, XP002715999, Retrieved from the Internet: URL: http://www.erg.abdn.ac.uk/future-net/digital-video/mpeg2-trans.html [retrieved on Nov. 7, 2013].
International Prelminary Report on Patentability for PCT/US2015/065934 dated Jul. 11, 2017, all pages.
Anonymous: "Documentation: Playback—VideoLAN Wiki", Dec. 25, 2010, XP055388595, Retrieved from the Internet: URL:https://wiki.videolan.org/index.php?Title=Documentation:Playback&oldid=18460 [retrieved on Jul. 6, 2017], 3 pages.
Anonymous: "How to Watch DVB-T With VLC Media Player", Jan. 25, 2009, XP055388602, Retrieved from the Internet: URL: http://www.izitips.com/software/how-to-watch-dvb-t-with-vlc-media-player/ [retrieved on Jul. 6, 2017], 3 pages.
Anonymous: "News—VideoLAN", Jul. 15, 2011, XP055388604, Retreived from the Internet: URL: http://www.videolan.org/news.html#news-2011-07-15 [retrieved on Jul. 6, 2017], 69 pages.
Office Action dated Jul. 18, 2017 for EP 12825147.7, 7 pages.
U.S. Appl. No. 15/143,999, filed May 2, 2016, Notice of Allowance dated Aug. 25, 2017, all pages.
U.S. Appl. No. 14/695,188 Final Office Action dated Jul. 28, 2017, all pages.
Anonymous: "The Angry Technician's Guide to streaming Freeview via VLC, you Idiots / The Angry Technician", Jun. 24, 2010, XP055388589, Retrieved from the internet: URL: https://angrytechnician.wordpress.com/2010/06/24/the-angry-technicians-guide-to-streaming-freeview-via-vlc-you-idiots/ [retrieved on Jul. 6, 2017], 14 pages.
U.S. Appl. No. 14/860,366, Non-Final Office Action dated Mar. 24, 2017, all pages.
U.S. Appl. No. 14/944,758, Non-Final Office Action dated Jan. 25, 2017, all pages.
U.S. Appl. No. 15/141,304, Non-Final Office Action dated Feb. 28, 2017, all pages.
Notice of Publication for BR 11 2013 032860-6 dated Jan. 24, 2017, 1 page.
Office Action for European Application No. 12825147 dated Aug. 23, 2016, all pages.
International Search Report and Written Opinion of PCT/US2012/51992 dated Nov. 2, 2012, 15 pages.
International Search Report and Written Opinion of PCT/US2012/51987 dated Oct. 23, 2012, 20 pages.
International Search Report and Written Opinion of PCT/US2012/051984 dated Nov. 5, 2012, 13 pages.
International Search Report and Written Opinion of PCT/US2012/52002 dated Oct. 16, 2012, 17 pages.
International Search Report and Written Opinion of PCT/US2013/031432 dated May 28, 2013, 10 pages.
International Preliminary Report on Patentability for PCT/US2013/031432 dated Sep. 16, 2014, 9 pages.
International Search Report and Written Opinion of PCT/US2013/031445 dated May 24, 2013, 11 pages.
International Preliminary Report on Patentability for PCT/US2013/031445 dated Sep. 16, 2014, 10 pages.
International Preliminary Report on Patentability for PCT/US2012/052002 dated Apr. 17, 2014, 10 pages.
International Search Report and Written Opinion of PCT/US2012/51964 dated Nov. 2, 2012, 13 pages.
International Search Report and Written Opinion of PCT/US2012/052011 dated Dec. 17, 2012, 44 pages.
International Preliminary Report on Patentability, PCT/US2012/052011, dated Mar. 6, 2014, 6 pages.
International Preliminary Report on Patentability, PCT/US2012/051984, dated Mar. 6, 2014, 8 pages.
International Preliminary Report on Patentability, PCT/US2012/051964, dated Apr. 10, 2014, 7 pages.
International Preliminary Report on Patentability, PCT/US2012/051992, dated Apr. 3, 2014, 7 pages.
International Preliminary Report on Patentability, PCT/US2012/051987, dated Mar. 6, 2014, 7 pages.
International Search Report of PCT/KR2007/003521 dated Oct. 23, 2007, 22 pages.
International Search Report of PCT/IB2003/005737 dated Mar. 2, 2004, 21 pages.
International Preliminary Report on Patentability for PCT/US2013/032176 dated Sep. 25, 2014, 7 pages.
International Search Report and Written Opinion of PCT/US2013/32176 dated Jun. 25, 2013, 15 pages.
International Search Report and Written Opinion of PCT/US2013/031565 dated May 31, 2013, 82 pages.
International Preliminary Report on Patentability for PCT/US2013/031565 dated Sep. 16, 2014, 18 pages.
International Preliminary Report on Patentability for PCT/US2013/031915 dated Sep. 16, 2014, 5 pages.
International Search Report and Written Opinion of PCT/US2013/031915 dated Jun. 3, 2013, 7 pages.
International Search Report and Written Opinion of PCT/US2013/031440 dated May 30, 2013, 14 pages.
European Search Report for EP 12825653 dated Mar. 11, 2015, 7 pages.
Extended European Search Report for EP 12825080 dated Sep. 11, 2014, 10 pages.
Extended European Search Report for EP 12825521 dated Nov. 24, 2014, 7 pages.
Extended European Search Report for EP 12825474 dated Jan. 7, 2015, 6 pages.
Extended European Search Report for EP 12825430 dated Feb. 3, 2015, 9 pages.
Supplementary European Search Report for Application No. EP 12825147 dated Mar. 27, 2015, 9 pages.
Supplementary European Search Report for EP 13761291.7 dated Jul. 9, 2015, 8 pages.
Supplementary European Search Report for EP 13760902 dated Oct. 20, 2015, all pages.
Supplementary European Search Report for EP 13761427 dated Oct. 19, 2015, all pages.
Extended European Search Report for EP 13760237.1 dated Jul. 21, 2015, 8 pages.
International Preliminary Report on Patentability for PCT/US2013/031440 dated Sep. 25, 2014, 8 pages.
First Office Action and Search Report from the State Intellectual Property Office (SIPO) for CN 201280031434.7, dated Jul. 17, 2015, 12 pages.
Office Action dated Jul. 31, 2015 for Mexican Patent Application No. MX/a/2014/009919, 2 pages.
The Notice of Allowance by the Mexican Institute of Industrial Property for Mexican Patent Application No. MX/a/2013/014677 dated Mar. 19, 2015 is not translated into English, 1 page.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
Office Action dated Jul. 31, 2015 for Mexican Patent Application No. MX/a/2014/009928, 2 pages.
The Notice of Allowance by the Mexican Institute of Industrial Property for Mexican Patent Application No. MX/a/2013/014671 dated Apr. 17, 2015, 1 page.
The Office Action dated Nov. 6, 2014 for Mexican Patent Application No. MX/a/2013/014677 is not translated into English, 2 pages.
The second Office Action dated Feb. 26, 2015 for Mexican Pat. Appln. No. MX/a/2013/014217 is not translated into English, 3 pages.
The Office Action dated Nov. 7, 2014 for Mexican Patent Application No. MX/a/2013/014907 is not translated into English, 3 pages.

(56) References Cited

OTHER PUBLICATIONS

The Office Action dated Jan. 23, 2015 for Mexican Patent Application No. MX/a/2013/014671 is not translated into English, 3 pages.
The Notice of Allowance by the Mexican Institute of Industrial Property for Mexican Patent Application No. MX/a/2013/014907 dated Feb. 20, 2015 is not translated into English, 1 page.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV It's simply great television," Accessed on Oct. 13, 2014, 11 pages. Retrieved from https//ee.co.uk/ee-and-me/ee-tv.
Author Unknown, "Move Networks is Delivering the Next Generation of Television," Move Networks, 2010, obtained online at http://movenetworks.com/, 2 pages.
Design and implementation of a multi-stream cableCARD with a high-speed DVB-common descrambler; Joonyoung Jung, Ohyung Kwon, Sooin Lee; in proceeding of: Proceedings of the 14th ACM International Conference on Multimedia, Santa Barbara, CA, USA, Oct. 23-27, 2006, 4 pages.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm> * Chapter: "How a disk works", Section: "The original problem". Retrieved on Jan. 9, 2014, 70 pages.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
U.S. Appl. No. 13/786,915, filed Mar. 6, 2013, Non Final Rejection dated Oct. 15, 2015, 59 pages.
U.S. Appl. No. 14/340,190, filed Jul. 24, 2014, Non-Final Rejection dated Aug. 31, 2015, 74 pages.
U.S. Appl. No. 14/154,887, filed Jan. 14, 2014 Non-Final Rejection dated Jul. 17, 2015, 33 pages.
U.S. Appl. No. 14/467,959, filed Aug. 25, 2014 Notice of Allowance dated Jun. 22, 2015, 36 pages.
U.S. Appl. No. 13/888,012, filed May 6, 2013 Non-Final Rejection dated Apr. 6, 2015, 36 pages.
U.S. Appl. No. 13/888,012, filed May 6, 2013 Notice of Allowance dated Jul. 14, 2015, 18 pages.
U.S. Appl. No. 13/856,752, filed Apr. 4, 2013 Non Final Office Action dated Nov. 5, 2014, 34 pages.
U.S. Appl. No. 13/856,752, filed Apr. 4, 2013 Notice of Allowance mailed Feb. 10, 2015, 20 pages.
U.S. Appl. No. 13/757,168, filed Feb. 1, 2013 Notice of Allowance dated Oct. 14, 2014, 28 pages.
U.S. Appl. No. 13/757,168, filed Feb. 1, 2013, Non Final Office Action dated Jun. 4, 2014, 23 pages.
U.S. Appl. No. 13/799,604, filed Mar. 13, 2013, Notice of Allowance dated Jul. 24, 2015, 34 pages.
U.S. Appl. No. 13/799,604, filed Mar. 13, 2013, Notice of Allowance dated May 29, 2015, 46 pages.
U.S. Appl. No. 13/799,604, filed Mar. 13, 2013, Final Office Action dated Jan. 14, 2015, 36 pages.
U.S. Appl. No. 13/799,604, filed Mar. 13, 2013, Non Final Office Action dated Jun. 6, 2014, 24 pages.
U.S. Appl. No. 13/149,852, filed May 31, 2011, Non-Final Office Action dated Dec. 12, 2012, 9 pages.
U.S. Appl. No. 13/149,852, filed May 31, 2011, Final Office Action dated Mar. 26, 2013, 13 pages.
U.S. Appl. No. 13/149,852, filed May 31, 2011, Notice of Allowance dated Jul. 11, 2013, 13 pages.
U.S. Appl. No. 13/286,157, filed Oct. 31, 2011, Non-Final Office Action dated Jan. 17, 2013, 20 pages.
U.S. Appl. No. 13/286,157, filed Oct 31, 2011, Non-Final Office Action dated Jul. 25, 2013, 49 pages.
U.S. Appl. No. 13/286,157, filed Oct 31, 2011, Notice of Allowance dated Feb. 3, 2014, 81 pages.
U.S. Appl. No. 13/215,702, filed Aug. 23, 2011, Notice of Allowance dated Feb. 11, 2013, 13 pages.
U.S. Appl. No. 13/288,002, filed Nov. 2, 2011, Non-final Office Action dated Sep. 26, 2013, 15 pages.
U.S. Appl. No. 13/288,002, filed Nov. 2, 2011, Final Office Action dated Mar. 27, 2014, 20 pages.
U.S. Appl. No. 13/288,002, filed Nov. 2, 2011 Non Final Rejection dated Jul. 28, 2015, 29 pages.
U.S. Appl. No. 13/302,852, filed Nov. 22, 2011 Non-Final Rejection dated May 23, 2013, 19 pages.
U.S. Appl. No. 13/302,852, filed Nov. 22, 2011, Notice of Allowance dated Jun. 19, 2015, 26 pages.
U.S. Appl. No. 13/302,852, filed Nov. 22, 2011, Final Rejection dated Dec. 9, 2013, 23 pages.
U.S. Appl. No. 13/302,852, filed Nov. 22, 2011, Non-Final Rejection dated Sep. 2, 2014, 28 pages.
U.S. Appl. No. 13/302,852, filed Nov. 22, 2011, Final Rejection dated Mar. 30, 2015, 29 pages.
U.S. Appl. No. 13/324,831, filed Dec. 13, 2011, Non-Final Office Action dated Feb. 28, 2013, 23 pages.
U.S. Appl. No. 13/324,831, filed Dec. 13, 2011, Notice of Allowance dated Sep. 4, 2013, 22 pages.
U.S. Appl. No. 13/292,047, filed Nov. 8, 2011, Non-Final Office Action dated Jan. 18, 2013, 17 pages.
U.S. Appl. No. 13/292,047, filed Nov. 8, 2011, Final Office Action dated Aug. 19, 2013, 17 pages.
U.S. Appl. No. 13/292,047, filed Nov. 8, 2011 Final Office Action dated Jan. 13, 2015, 22 pages.
U.S. Appl. No. 13/292,047, filed Nov. 8, 2011 Non-Final Office Action dated Jul. 7, 2015, 28 pages.
U.S. Appl. No. 13/614,899, filed Sep. 13, 2012, Non-Final Office Action dated Feb. 5, 2013, 17 pages.
U.S. Appl. No. 13/614,899, filed Sep. 13, 2012, Non-Final Office Action dated May 20, 2014, 25 pages.
U.S. Appl. No. 13/614,899, filed Sep. 13, 2012, Non-Final Office Action dated Sep. 17, 2013, 17 pages.
U.S. Appl. No. 13/614,899, filed Sep. 13, 2012, Final Office Action dated Mar. 17, 2014, 41 pages.
U.S. Appl. No. 13/614,899, filed Sep. 13, 2012, Notice of Allowance dated Mar. 13, 2015, 35 pages.
U.S. Appl. No. 13/291,014, filed Nov. 7, 2011, Non-Final Office Action dated Mar. 29, 2013, 21 pages.
U.S. Appl. No. 13/291,014, filed Nov. 7, 2011, Notice of Allowance dated Aug. 7, 2013, 16 pages.
U.S. Appl. No. 13/215,598, filed Aug. 23, 2011, Non-Final Office Action dated Jun. 20, 2013, 15 pages.
U.S. Appl. No. 13/215,598, filed Aug. 23, 2011, Final Office Action dated Nov. 21, 2013, 23 pages.
U.S. Appl. No. 13/215,598, filed Aug. 23, 2011, Non-Final Office Action dated Feb. 6, 2014, 12 pages.
U.S. Appl. No. 13/215,598, filed Aug. 23, 2011 Non-Final Office Action dated Nov. 25, 2014, 18 pages.
U.S. Appl. No. 13/215,598, filed Aug. 23, 2011 Final Office Action dated Jul. 2, 2014, 22 pages.
U.S. Appl. No. 13/215,598, filed Aug. 23, 2011 Final Office Action dated May 5, 2015, 17 pages.
U.S. Appl. No. 13/215,598, filed Aug. 23, 2011 Non Final Office Action dated Dec. 15, 2015, all pages.
U.S. Appl. No. 13/215,655, filed Aug. 23, 2011, Non-Final Office Action dated Sep. 6, 2013, 27 pages.
U.S. Appl. No. 13/215,655, filed Aug 23, 2011, Final Office Action dated Dec. 18, 2013, 20 pages.
U.S. Appl. No. 13/215,916, filed Aug. 23, 2011, Notice of Allowance dated Jan. 4, 2013, 10 pages.
U.S. Appl. No. 13/294,005, filed Nov. 11, 2011 Notice of Allowance dated Oct. 31, 2014, 24 pages.
U.S. Appl. No. 13/294,005, filed Nov. 11, 2011 Non-Final Office Action dated May 20, 2014, 33 pages.

(56) References Cited

OTHER PUBLICATIONS

U.S. Appl. No. 13/294,005, filed Nov. 11, 2011, Non-Final Office Action dated Aug. 14, 2013, 32 pages.
U.S. Appl. No. 13/294,005, filed Nov. 11, 2011, Final Office Action dated Jan. 3, 2014, 29 pages.
U.S. Appl. No. 13/592,976, filed Aug. 23, 2012, Notice of Allowance dated Oct. 7, 2013, 18 pages.
U.S. Appl. No. 13/797,173, filed Mar. 12, 2013 Notice of Allowance dated Nov. 24, 2014, 37 pages.
U.S. Appl. No. 13/797,173, filed Mar. 12, 2013 Notice of Allowance dated Feb. 26, 2015, 19 pages.
U.S. Appl. No. 13/797,173, filed Mar. 12, 2013, Non Final Office Action dated May 15, 2014, 28 pages.
U.S. Appl. No. 13/799,653, filed Mar. 13, 2013 Notice of Allowance dated Nov. 26, 2014, 32 pages.
U.S. Appl. No. 13/799,653, filed Mar. 13, 2013, Non Final Office Action dated May 8, 2014, 24 pages.
U.S. Appl. No. 13/801,968, filed Mar. 13, 2013 Non Final Office Action dated May 21, 2015, 49 pages.
U.S. Appl. No. 13/801,968, filed Mar. 13, 2013 Final Office Action dated Nov. 19, 2015, all pages.
U.S. Appl. No. 13/829,350, filed Mar. 14, 2013, Non Final Office Action dated Feb. 28, 2014, 29 pages.
U.S. Appl. No. 13/829,350, filed Mar. 14, 2013 Non Final Office Action dated Jul. 29, 2014, 24 pages.
U.S. Appl. No. 13/829,350, filed Mar. 14, 2013 Final Office Action dated Jan. 23, 2015, 18 pages.
U.S. Appl. No. 13/829,350, filed Mar. 14, 2013 Notice of Allowance dated Jul. 24, 2015, 29 pages.
U.S. Appl. No. 13/828,001, filed Mar. 14, 2013, Notice of Allowance dated Apr. 25, 2014, 43 pages.
U.S. Appl. No. 13/799,719, filed Mar. 13, 2013, Non Final Office Action dated Oct. 25, 2013, 79 pages.
U.S. Appl. No. 13/799,719, filed Mar. 13, 2013, Notice of Allowance dated Apr. 23, 2014, 141 pages.
U.S. Appl. No. 13/801,994, Non Final Office Action dated Oct. 7, 2015, 55 pages.
U.S. Appl. No. 14/064,423, filed Oct. 28, 2013, Non-Final Office Action dated Dec. 20, 2013, 18 pages.
U.S. Appl. No. 14/064,423, filed Oct. 28, 2013, Notice of Allowance dated Mar. 4, 2013, 37 pages.
U.S. Appl. No. 14/060,388, filed Oct. 22, 2013, Notice of Allowance dated Apr. 13, 2015, 44 pages.
U.S. Appl. No. 13/793,636, filed Mar. 11, 2013, Non-Final Office Action dated Sep. 29, 2014, 27 pages.
U.S. Appl. No. 13/793,636, filed Mar. 11, 2013, Notice of Allowance dated Jan. 28, 2015, 43 pages.
U.S. Appl. No. 14/095,860, filed Dec. 3, 2013 Non-Final Office Action dated Dec. 26, 2014, 45 pages.
U.S. Appl. No. 14/095,860, filed Dec. 3, 2013 Final Office Action dated May 1, 2015, 18 pages.
U.S. Appl. No. 14/095,860, filed Dec. 3, 2013 Notice of Allowance dated Jul. 13, 2015, 31 pages.
U.S. Appl. No. 14/095,860, filed Dec. 3, 2013 Notice of Allowance dated Oct. 19, 2015, 14 pages.
U.S. Appl. No. 14/338,114, filed Jul. 22, 2014 Non-Final Office Action dated Sep. 30, 2015, all pages.
U.S. Appl. No. 14/529,989, filed Oct. 31, 2014 Non-Final Office Action dated Nov. 4, 2015, all pages.
U.S. Appl. No. 13/795,914, filed Mar. 6, 2013 Notice of Allowance dated Jul. 21, 2014, 13 pages.
U.S. Appl. No. 13/795,914, filed Mar. 6, 2013 Final Office Action dated Apr. 3, 2014, 17 pages.
U.S. Appl. No. 13/795,914, filed Mar. 6, 2013, Non-Final Office Action dated Oct. 11, 2013, 17 pages.
U.S. Appl. No. 13/800,477, filed Mar. 13, 2013 Non-Final Office Action dated Sep. 11, 2014, 34 pages.
U.S. Appl. No. 13/800,477, filed Mar. 13, 2013 Notice of Allowance dated Feb. 18, 2015, 18 pages.

U.S. Appl. No. 14/043,617, filed Oct. 1, 2013 Non-Final Office Action dated Jan. 5, 2015, 45 pages.
U.S. Appl. No. 14/043,617, filed Oct. 1, 2013 Final Office Action dated Jul. 16, 2015, 45 pages.
U.S. Appl. No. 14/043,617, filed Oct. 1, 2013 Non-Final Office Action dated Oct. 23, 2015, all pages.
U.S. Appl. No. 14/676,137, filed Apr. 1, 2015 Notice of Allowance dated Sep. 28, 2015, 35 pages.
U.S. Appl. No. 14/591,549, Non Final Office Action dated Dec. 31, 2015, 19 pages.
U.S. Appl. No. 13/288,002, filed Nov. 2, 2011 Final Rejection dated Jan. 13, 2016, 22 pages.
Second Office Action for CN 201280031434.7, dated Dec. 23, 2015, 6 pages.
First Office Action issued by State Intellectual Property Office (SIPO) for CN 201280028697.2, dated Dec. 16, 2015, 11 pages.
Notice of Allowance received for Mexican Patent Appln. MX/a/2013/014991, dated Dec. 9, 2015, 1 page.
Notice of Allowance dated Dec. 4, 2015 for Mexican Patent Application No. MX/a/2014/009723, 1 page.
Office Action for EP 13 192 169.4 dated Mar. 29, 2016, all pages.
U.S. Appl. No. 13/786,915, filed Mar. 6, 2013, Notice of Allowance dated Jul. 19, 2016, all pages.
U.S. Appl. No. 14/757,606, filed Dec. 23, 2015, Notice of Allowance dated Jul. 18, 2016, all pages.
U.S. Appl. No. 14/340,190, filed Jul. 24, 2014, Notice of Allowance dated Aug. 22, 2016, all pages.
U.S. Appl. No. 14/591,549, Final Office Action dated Jun. 30, 2016, all pages.
U.S. Appl. No. 14/591,549, Non Final Office Action dated Dec. 14, 2016, all pages.
U.S. Appl. No. 14/695,188 Non Final Office Action dated Dec. 30, 2016, all pages.
U.S. Appl. No. 14/043,617, filed Oct. 1, 2013, Non-Final Office Action dated Sep. 29, 2016, all pages.
U.S. Appl. No. 14/043,617, filed Oct. 1, 2013, Notice of Allowance dated Dec. 23, 2016, all pages.
U.S. Appl. No. 15/131,868, filed Apr. 18, 2016 Non-Final Office Action dated Jan. 13, 2017, all pages.
Notice of Publication for BR 11 2013 032035-4 dated Dec. 20, 2016, 1 page.
Notice of Publication for BR 11 2013 032380-9 dated Jan. 3, 2017, 1 page.
Notice of Publication for BR 11 2013 032377-9 dated Jan. 3, 2017, 1 page.
Office Action for European Application No. 12825147 dated Mar. 7, 2016, all pages.
First Office Action and Search Report for CN Appln No. 201380014409.2 dated Oct. 9, 2016, all pages.
Office Action dated Nov. 29, 2016 for EP 13 761 291.7, all pages.
Evans, Brent: "GeekTonic: Jan. 25, 2009-Feb. 1, 2009", Jan. 31, 2009, SP55322053, 26 pages. Retreived from the Internet: URL: http://www.geektonic.com/2009_01_25_archive.html [retrieved on Nov. 23, 2016].
First Office Action and Search Report from the State Intellectual Property Office (SIPO) for CN 201280031150.8, dated Aug. 3, 2016, 10 pages.
Decision to Grant from the State Intellectual Property Office (SIPO) for CN 201280031434.7, dated May 12, 2016, all pages.
Second Office Action issued by State Intellectual Property Office for CN 201280028697.2, dated Jul. 8, 2016, all pages.
First Office Action and Search Report for CN Appln No. 201280030476.9 dated Aug. 9, 2016, all pages.
Notice of Allowance dated Jul. 21, 2016 for Mexican Patent Application No. MX/a/2015/10334, 1 page.
Notice of Allowance dated Jun. 3, 2016 for Mexican Patent Application No. MX/a/2015/009985, 1 page.
Notice of Allowance dated Jun. 6, 2016 for Mexican Patent Application No. MX/a/2015/015383, 1 page.
Author Unknown, "Digital Video Broadcasting (DVB); Specification for Service Information (SI) in DVB systems," ETSI EN 300 468 V1.1 (Jan. 2013), 172 pages.

(56) References Cited

OTHER PUBLICATIONS

Author Unknown, Digital Video Broadcasting (DVB); Content Protection and Copy Management (DVB-CPCM); Part 3: CPCM Usage State Information; European Broadcasting Union Union Europa de Radio-Television, ETSI TS 102 825-3 V1.1.1 (Jul. 2008), XP014042034, 28 pages.
Hee-Yong Kim et al., "DCT Domain Filter for ATV Down Conversion", Consumer Electronics, 1997. Digest of Technical Papers. ICCE., International Conference on, IEEE, Jun. 11, 1997, pp. 142-143, XP032381904, DOI: 10.1109/ICCE. 1997.625904, ISBN: 978-0-7803-3734-3.
International Search Report and Written Opinion of PCT/US2015/065934 dated Apr. 8, 2016, all pages.
International Search Report and Written Opinion of PCT/EP2015/073937 dated Apr. 15, 2016, all pages.
U.S. Appl. No. 14/757,606, filed Dec. 23, 2015, Non Final Rejection dated Mar. 24, 2016, 33 pages.
U.S. Appl. No. 14/340,190, filed Jul. 24, 2014, Final Rejection dated Feb. 19, 2016, 54 pages.
U.S. Appl. No. 14/154,887, filed Jan. 14, 2014 Notice of Allowance dated Jan. 21, 2016, 26 pages.
U.S. Appl. No. 13/292,047, filed Nov. 8, 2011 Notice of Allowance dated Jan. 29, 2016, 45 pages.
U.S. Appl. No. 13/801,968, filed Mar. 13, 2013 Notice of Allowance dated Apr. 7, 2016, 33 pages.
U.S. Appl. No. 14/589,090, Notice of Allowance dated Feb. 9, 2016, 47 pages.
U.S. Appl. No. 14/338,114, filed Jul. 22, 2014 Notice of Allowance dated Feb. 3, 2016, all pages.
Notice of Allowance dated Jan. 15, 2016 for Mexican Patent Application No. MX/a/2014/009928, 1 page.
Notice of Allowance dated Dec. 16, 2015 for Mexican Patent Application No. MX/a/2014/009919, 1 page.
U.S. Appl. No. 13/786,915, filed Mar. 6, 2013, Final Rejection dated May 12, 2016, 27 pages.
U.S. Appl. No. 13/215,598, filed Aug 23, 2011 Notice of Allowance dated May 24, 2016, all pages.
U.S. Appl. No. 13/801,994, Final Office Action dated May 4, 2016, 37 pages.
U.S. Appl. No. 14/529,989, filed Oct. 31, 2014, Final Rejection dated May 6, 2016, 27 pages.
U.S. Appl. No. 14/043,617, filed Oct. 1, 2013 Final Office Action dated May 6, 2016, 56 pages.
U.S. Appl. No. 15/141,304, Final Rejection dated Oct. 18, 2017, all pages.
U.S. Appl. No. 15/141,304, Non-Final Office Action dated Apr. 6, 2018, all pages.
U.S. Appl. No. 15/815,452, filed Nov. 16, 2017 Non-Final Rejection dated Mar. 13, 2018, all pages.
Third Office Action issued by State Intellectual Property Office for CN 201280028697.2, dated Dec. 29, 2016, all pages.

\* cited by examiner

AUTOMATICALLY RECORDING SUPPLEMENTAL CONTENT

CROSS-REFERENCES TO RELATED APPLICATIONS

This application is a Continuation and claims priority to co-pending U.S. patent application Ser. No. 13/888,012, filed on May 6, 2013, and entitled AUTOMATICALLY RECORDING SUPPLEMENTAL CONTENT, which is a Continuation and claims priority to U.S. patent application Ser. No. 13/215,702, filed on Aug. 23, 2011, now U.S. Pat. No. 8,447,170, and entitled AUTOMATICALLY RECORDING SUPPLEMENTAL CONTENT, the entire disclosure of which is incorporated by reference for all purposes.

FIELD OF THE INVENTION

This disclosure relates generally to content recording, and more specifically to automatically recording content that is associated with other automatically recorded content and therefore supplements the other automatically recorded content (which may replace instead of adding to the other content in some cases).

SUMMARY

Content may be defined as online content if it is broadcast by a programming provider and may be defined as offline content if it is available from a source other than broadcast by the programming provider. In one or more implementations, systems and methods of the present disclosure may supplement recording of online content that is automatically recorded when broadcast by a programming provider (such as a satellite programming provider) by automatically recording one or more instances of offline content (which are associated in one or more ways with the online recorded content) from a source other than the content broadcast by the programming provider. For example, the offline content may include content broadcast by one or more terrestrial broadcast systems and/or other over-the-air content transmission systems, content available via one or more Internet protocol connections, and/or any source of content other than that broadcast by the programming provider. Further, the recorded offline content may be considered to supplement the recorded online content because the recorded offline content is associated with the recorded online content and is obtained from a source other than the broadcast of the programming provider as opposed to the recorded offline content being limited to trailers for the recorded online content and/or other such supporting content.

As such, the present disclosure discloses systems and methods for automatically recording supplemental content. One or more first content providers may transmit instructions to one or more content receivers to record multiple instances of content. The multiple instances of content may be included in the same frequency band of at least one broadcast transmitted by the content provider via a first communication link and scrambled utilizing the same control word. The content provider may determine to supplement the multiple instances of content (which may be based on associations between the multiple instances of content and supplemental content) and may transmit one or more instructions to record one or more supplemental instances of content from at least one second content provider via a second communication link.

The content receiver may receive the instructions to record the multiple instances of content and may accordingly receive and store (and/or descramble, decode, display, and/or perform other such operations) the multiple instances of content. The content receiver may also receive the instruction to record the supplemental instance of content and receive the supplemental instance of content via the second communication link and store the supplemental instance of content.

In some implementations, the first communication link may be a satellite communication link and the second communication link may be a different type of communication link such as a terrestrial broadcast communication link and/or an Internet protocol communication link.

In various implementations, the multiple instances of content may all be members of a group of content and the supplemental instances of content may be members of the group of content that are not included in the multiple instances of content, different versions of instances of content included in the multiple instances of content, instances of content that correspond to subchannels of channels that correspond to instances of content included in the multiple instances of content, and so on.

In some implementations, the supplemental instance of content may be not be available from the content provider that provides the multiple instances of content but is available from another content provider. Further, in various implementations, the supplemental instances of content may be selected based on received user input. Moreover, in some implementations, the recording of the supplemental instance of content may replace one of more of the recorded multiple instances of content.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
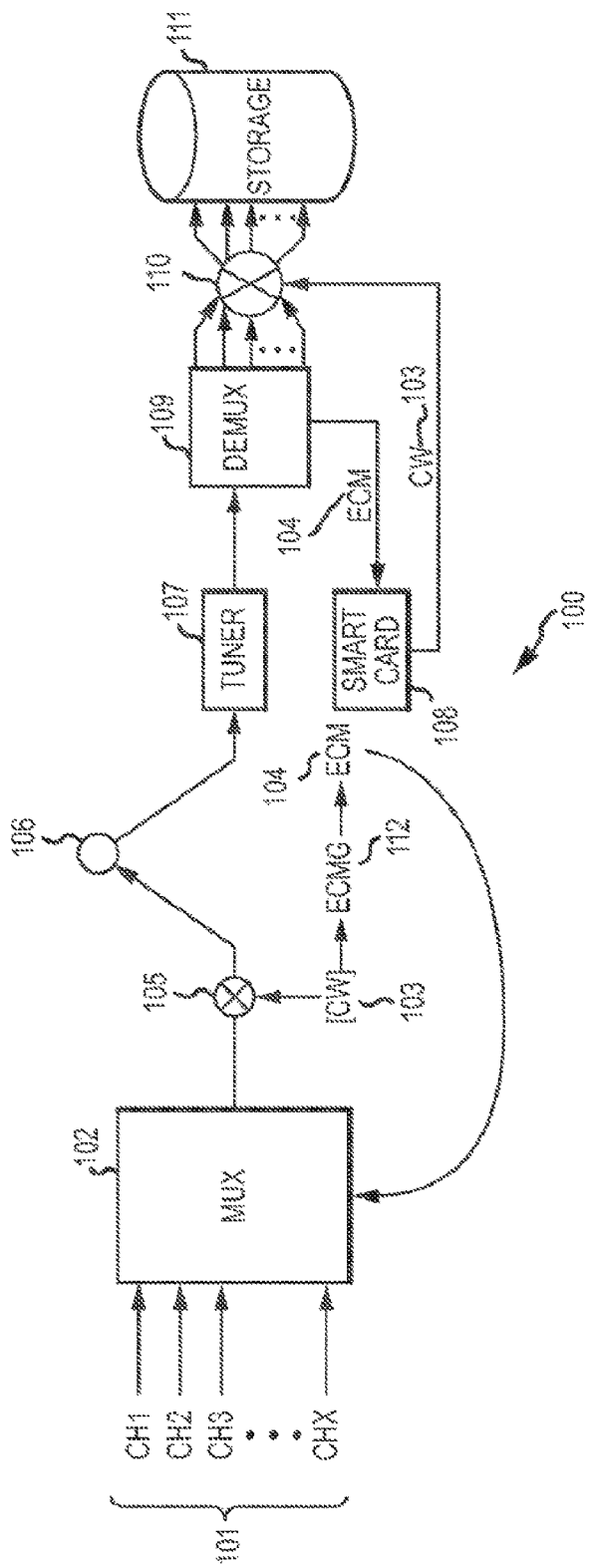
FIG. 1 is a block diagram illustrating a system for automatically recording multiple instances of content from one or more programming providers.

The description that follows includes sample systems, methods, and computer program products that embody various elements of the present disclosure. However, it should be understood that the described disclosure may be practiced in a variety of forms in addition to those described herein.

In various implementations, systems and methods of the present disclosure may supplement automatic recording of online content broadcast by a programming provider (such as a satellite programming provider) by automatically recording associated offline content from a source other than the programming provider. For example, the offline content may be obtained from one or more terrestrial broadcast systems and/or other over-the-air content transmission systems, one or more Internet protocol connections, and/or any source of content other than the programming provider. Hence, content may be considered online if it is broadcast by the programming provider and offline if it is available from a source other than broadcast by the programming provider. Additionally, the recorded offline content may be considered to supplement the recorded online content because the recorded offline content is associated with the recorded online content and is obtained from a source other than the broadcast of the programming provider. The recorded offline content is not limited to trailers for the recorded online content and/or other such supporting content because the recorded offline content is referred to herein as supplementary content.

Content receivers (such as set top boxes, television receivers, digital video recorders, mobile computers, cellular telephones, smart phones, tablet computers, desktop computers, and so on) may receive content from one or more programming providers (such as satellite television programming providers, cable television programming providers, Internet service providers, video on demand providers, pay-per-view movie providers, digital music providers, and so on) via one of more communication connections (such as satellite communication connections, coaxial cable communication connections, Internet communication connections, radio-frequency connections, and so on). Such content receivers may transmit such received content to one or more presentation devices and/or store the received content for later presentation.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the programs may include multiple PIDs (packet identifiers), such as a video PID and one or more audio PIDs for a particular instance of content. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels, such as by utilizing a PID filter to keep data identified by PIDs related to the particular programming channel and discard data identified by PIDs not related to that particular programming channel. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "primetime events" associated with all channels defined as "primetime television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM by an ECM generator 112 which may take the CW as an input (and may also include other information such as access criteria) and outputs the ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency (which may be filtered by a PID filter, not shown) may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the CW prior to multiplexing. In another example, in some implementations, the data received via the tuned frequency may be demultiplexed before being individually descrambled utilizing the CW.

In some implementations of the system of FIG. 1, multiple instances of content may be recorded simultaneously from a single transponder and stored in the non-transitory storage medium 111 of the content receiver as a single file of multiple recorded instances of content. Upon playing of one instance of content from the single file of the multiple recorded instances of content, the content receiver may read the file incrementally so as to play the one instance of content while filtering out the other file contents (e.g., the other instance of content within the file).

The system 100 provides automatic recording of multiple instances of content from a content provider. However, the system 100 may not provide the ability to also automatically record supplemental content that is associated with the multiple instances of content. This may particularly be the case if the supplemental content is not available from the content provider, such as when a particular television channel (and/or a particular subchannel of a channel that is carried) is not carried by a content provider.

For example, the multiple instances of content may include all of the television programming aired by three of the four major television networks between the times of seven PM and 10 PM mountain time. It may be desired to automatically record all of the television programming aired by all four major television networks between the times of seven PM and 10 PM mountain time, but the content provider may not be able to provide the television programming aired by the fourth major television network. In another example, the multiple instances of content available from the content provider may have a particular resolution, but other versions of the multiple instances of content that have a higher resolution may be available from other sources. As such, a user may want to automatically record higher resolution versions to supplement the automatic recording of the multiple instances of content, possibly replacing one or more of the multiple instances of content that is automatically recorded.

The present disclosure discloses systems and methods for automatically recording supplemental content. At least one first content provider may transmit instructions to one or more content receivers to record multiple instances of content. The instructions may specify for the content receiver to record the multiple instances of content from at least one broadcast transmitted by the content provider via a first communication link (such as a satellite communication link) wherein the multiple instances of content are all included in the same frequency band of the broadcast and scrambled utilizing the same control word.

The content provider may determine to supplement the multiple instances of content and may transmit one or more instructions to record one or more supplemental instances of content from at least one second content provider via a second communication link (such as a terrestrial broadcast communication link and/or an Internet protocol communication link). The content provider may determine to supplement the multiple instances of content based on one or more associations between the multiple instances of content and the supplemental instance of content.

The content receiver may receive the instructions to record the multiple instances of content. In response to the instructions to record the multiple instances of content, the content receiver may accordingly receive the multiple instances of content via the first communication link, descramble the multiple instances of content utilizing the same control word (which may be obtained by decrypting the same entitlement control message), and store the multiple instances of content. The content receiver may also receive the instruction to record the supplemental instance of content, receive the supplemental instance of content via the second communication link, and store the supplemental instance of content. As such, the content receiver is enabled to automatically record the multiple instances of content from the first content provider as well as automatically record supplemental instances of content.

Figure 2:
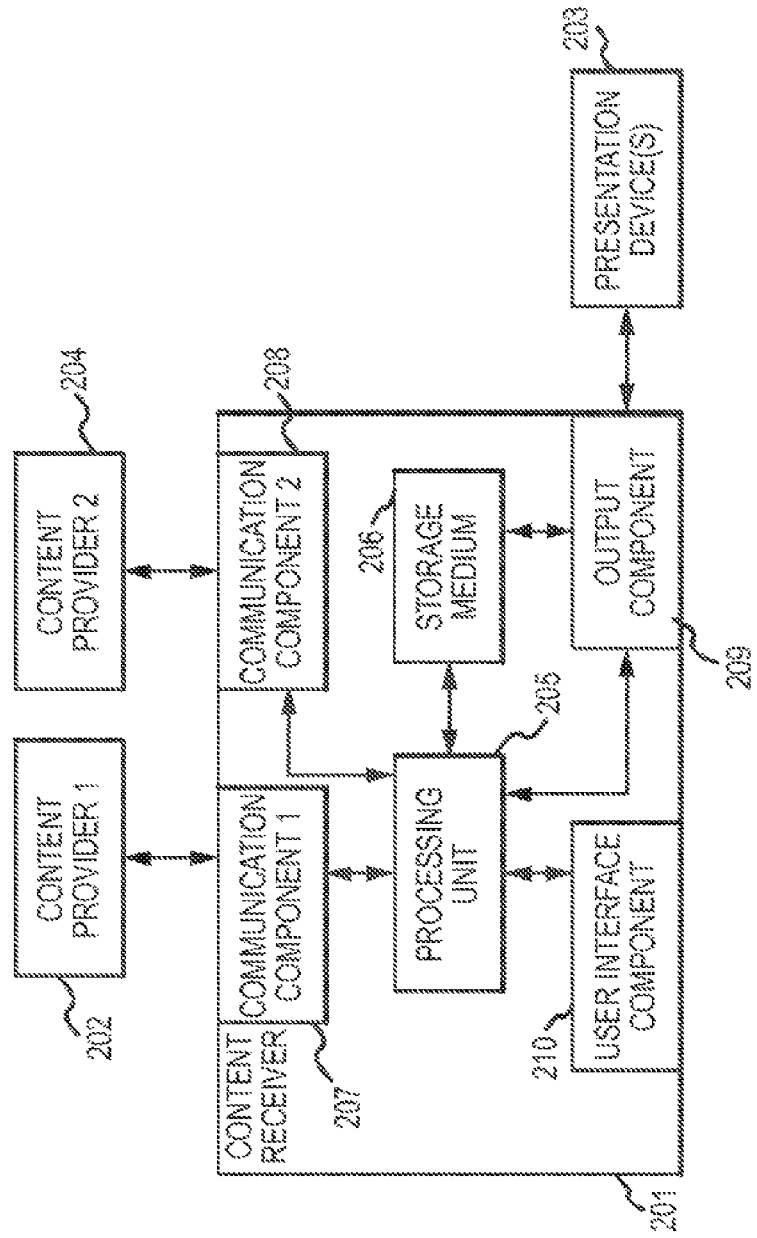
FIG. 2 is a block diagram illustrating a system for automatically recording supplemental content. This system may be interrelated with the system of FIG. 1.

FIG. 2 is a block diagram illustrating a system 200 for automatically recording supplemental content. This system 200 may be interrelated with the system 100 of FIG. 1. The system 200 includes a content receiver 201 which may be any kind of content receiver such as a set top box, a television receiver, a digital video recorder, a mobile computer, a cellular telephone, a smart phone, a tablet computer, a desktop computer, and/or any other kind of device capable of receiving content from one or more content providers. The system may also include a content provider 202 and a content provider 204, both of which may be any kind of content provider such as a satellite and/or cable television provider, a video on demand provider, a pay-per-view movie provider, a digital music provider, and/or any other provider capable of transmitting content to the content receiver. Further, the system may include one or more presentation devices 203 which may be any kind such as a cathode ray tube display, a liquid crystal display, a computer monitor, a television, a speaker, a plasma screen display, a printer, and/or any other device capable of presenting content transmitted by the content receiver.

The content receiver 201 may include one or more processing units 205, non-transitory storage media 206, communication components 1 and 2 207 and 208, output component 209, and user interface components 210. The processing unit may execute instructions stored in the non-transitory storage medium to receive content from the content provider 1 202 via the communication component 1 207 and/or receive content from the content provider 2 204 via the communication component 2 208, store such content in the non-transitory storage medium, and/or transmit such content to the presentation device 203 via the output component. The processing unit may perform such actions in response to instructions received from a user via the user interface component and/or instructions received from the content provider 1 202 via the communication component 1 207 and/or receive content from the content provider 2 204 via the communication component 2 208.

The content receiver 201 may receive instructions for automatically recording multiple instances of content from the content provider 1 202 via the communication component 207 as described with respect to FIG. 1 above (in which case the communication component 1 207 may perform the functions of the tuner 107 and the processing unit 105 may include components that perform the functions of the smart card 108, the descrambler 110, and/or the demultiplexer 109). The multiple instances of content be included in one or more broadcasts transmitted the content provider 1 202 via a first communication link (such as a satellite communication link) to the communication component 207 wherein the multiple instances of content are all included in the same frequency band of the broadcast and scrambled utilizing the same control word. Based on the instructions for automatically recording the multiple instances of content, the content receiver may receive the multiple instances of content, descramble the multiple instances of content utilizing the same control word, and store the multiple instances of content in the non-transitory storage medium.

The content receiver 201 may receive instructions for automatically recording one or more supplemental instances of content. The instructions for automatically recording the supplemental instance of content may be received from the content provider 1 202 via the communication component 207 and may specify to record the supplemental instance of content from the content provider 2 204 via a second communication link (such as a terrestrial broadcast link and/or an Internet protocol link) utilizing the communication component 2 208. The supplemental content may have one or more associations with the multiple instances of content.

As described with respect to FIG. 1 above, in some implementations, the multiple instances of content may all be members of a group of content, such as television programming aired by one or more of the major four television networks between the hours of seven PM and ten PM mountain time. In such implementations, the supplemental instances of content may include instances of content that are members of the group of content but are not included in the multiple instances of content, different versions of instances of content included in the multiple instances of content (such as higher resolution versions), instances of content that correspond to subchannels of channels that correspond to instances of content included in the multiple instances of content, and so on.

In some implementations, the supplemental instance of content may be available from the content provider 2 204 but may not be available from the content provider 1 202. Further, in various implementations, the content provider 1 202 may select the supplemental instance of content to transmit recording instructions regarding in response to user input received via the user interface component 210. Moreover, in some implementations, the supplemental instance of content may replace one of more of the multiple instances of content and the respective instance of content of the multiple instance of content may be deleted, overwritten, and/or otherwise removed from the non-transitory storage medium 206 when the supplemental instance of content is recorded.

Figure 3:
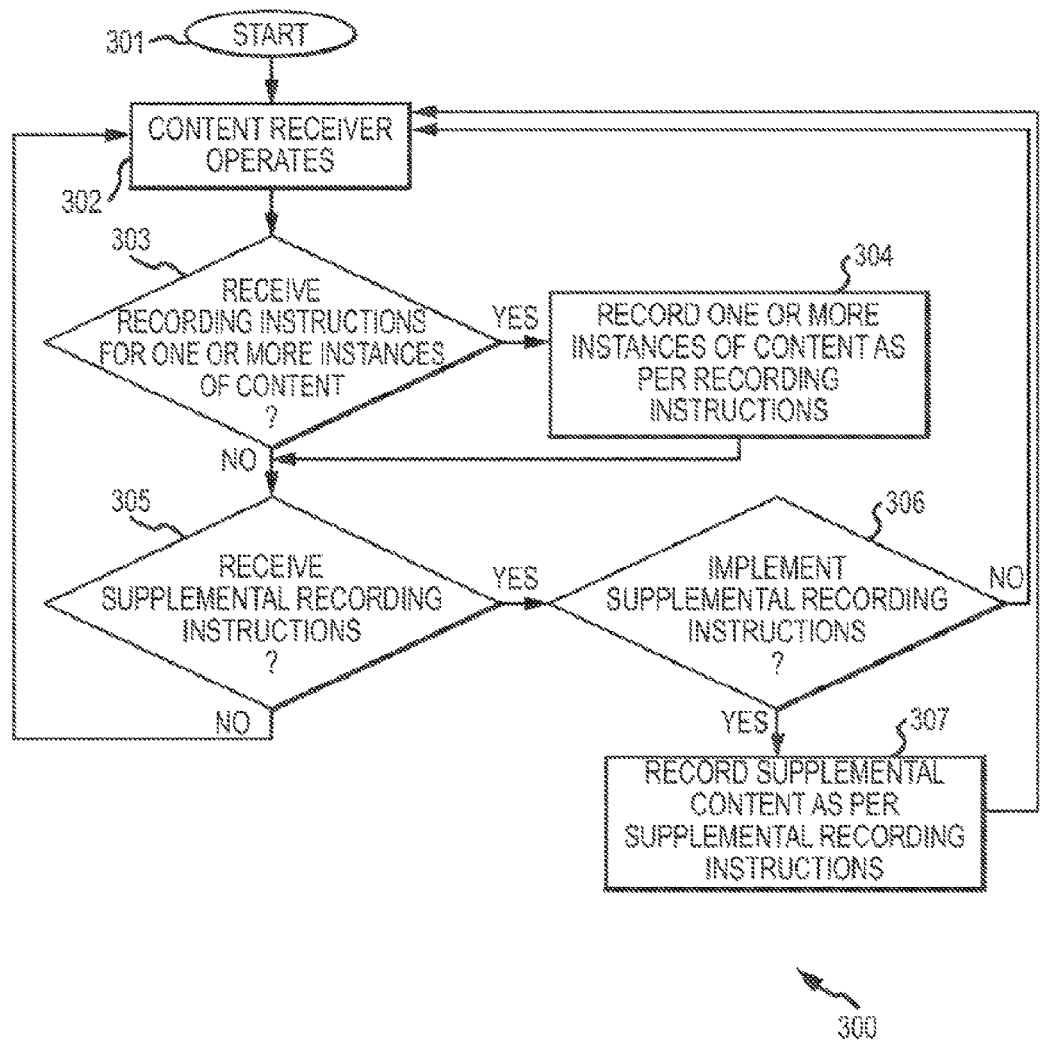
FIG. 3 is a flow chart illustrating a first example method for automatically recording supplemental content. This method may be performed by the system of FIG. 2.

FIG. 3 illustrates a first example method 300 for automatically recording supplemental content. The method 300 may be performed by the content receiver 201 of FIG. 2. The flow begins at block 301 and proceeds to block 302 where the content receiver operates. The flow then proceeds to block 303 where the processing unit 205 determines whether or not instructions to automatically record one or more instances of content have been received. If so, the flow proceeds to block 304 where the processing unit records the one or more instances of content in the non-transitory storage medium 206 before the flow proceeds to block 305. Otherwise, the flow proceeds directly to block 305.

At block 305, the processing unit 205 determines whether or not supplemental instructions to automatically record supplemental instances of content have been received. If not, returns to block 302 and the content receiver 201 continues to operate. Otherwise, the flow proceeds to block 306.

At block 306, after the processing unit 205 determines that supplemental instructions to automatically record supplemental instances of content have been received, the processing unit determines whether or not to implement the supplemental instructions to automatically record the supplemental instances of content. The processing unit may make this determination based on one or more user inputs, configuration settings, and so on. If so, the flow proceeds to block 307 where the processing unit records the supplemental instances of content in the non-transitory storage medium before the flow returns to block 302 and the content receiver 201 continues to operate. Otherwise, the flow returns directly to block 302 and the content receiver continues to operate.

Figure 4:
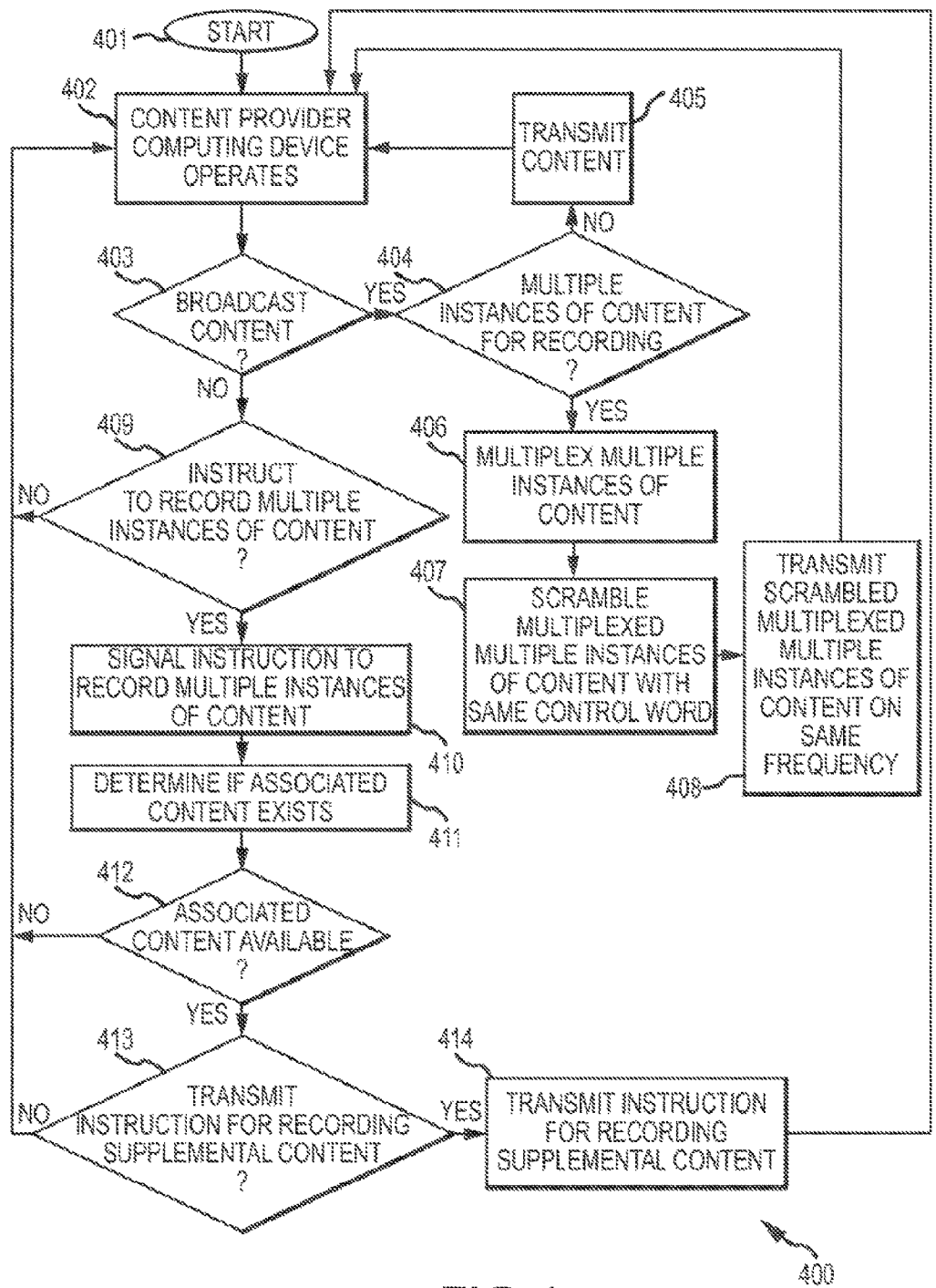
FIG. 4 is a flow chart illustrating a second example method for automatically recording supplemental content. This method may be performed by the system of FIG. 2.

FIG. 4 illustrates a second example method 400 for automatically recording supplemental content. The method 400 may be performed by one or more computing devices of the content provider 1 202 of FIG. 2. The flow begins at block 401 and proceeds to block 402 where the computing device of the content provider 1 202 operates. The flow then proceeds to block 403 where the computing device of the content provider determines whether or not to broadcast content to the content receiver 201. The computing device of the content provider may broadcast content to the content receiver as part of broadcasting content to a plurality of different content receivers. If so, the flow proceeds to block 404. Otherwise, the flow proceeds to block 409.

At block 404, after the computing device of the content provider 1 202 determines to transmit content to the content receiver 201, the computing device of the content provider determines whether or not the content to be transmitted includes multiple instances of content to be automatically recorded. If not, the flow proceeds to block 405 where the computing device of the content provider transmits content to the content receiver before the flow returns to block 402 and the computing device of the content provider continues to operate. Otherwise, the flow proceeds to block 406.

At block 406, after the computing device of the content provider 1 202 determines that the content to be transmitted includes multiple instances of content to be automatically recorded, the computing device of the content provider multiplexes the multiple instances of content and the flow proceeds to block 407. At block 407, the computing device of the content provider scrambles the multiple instances of content utilizing the same control word. The flow then proceeds to block 408 where the computing device of the content provider transmits the scrambled and multiplexed multiple instances of content via the same frequency band of a broadcast. Next, the flow returns to block 402 where the computing device of the content provider continues to operate.

At block 409, after the computing device of the content provider 1 202 determines not to transmit content to the content receiver 201, the computing device of the content provider determines whether or not to transmit instructions to automatically record multiple instances of content to the content receiver. If not, the flow returns to block 402 and the computing device of the content provider continues to operate. Otherwise, the flow proceeds to block 410.

At block 410, after the computing device of the content provider 1 202 determines to transmit instructions to automatically record multiple instances of content to the content receiver 201, the computing device of the content provider signals the instructions and the flow proceeds to block 411. At block 411, the computing device of the content provider determines if content exists that is associated with the multiple instances of content. The flow then proceeds to block 412 where the computing device of the content provider determines whether or not associated content is available. If not, the flow returns to block 402 and the computing device of the content provider continues to operate. Otherwise, the flow proceeds to block 413.

At block 413, after the computing device of the content provider 1 202 determines that associated content is available, the computing device of the content provider determines whether or not to transmit supplemental instructions to the content receiver 201 to automatically record supplemental content. If not, the flow returns to block 402 and the computing device of the content provider continues to operate. Otherwise, the flow proceeds to block 414 where the computing device of the content provider transmits the supplemental instructions to the content receiver and the flow returns to block 402 where the computing device of the content provider continues to operate.

Returning to FIG. 2, in a first example, the content provider 1 202 may instruct the content receiver 201 to automatically record multiple instances of content, included in the same frequency band of a broadcast, corresponding to television programs broadcast by three of the four major television networks between the hours of seven PM and ten PM mountain time. The content provider 1 202 may desire to include such television programs broadcast by all four of the major television networks, but the same frequency band of the broadcast may not include sufficient capacity to include such television programs broadcast by all four of the major television networks. As such, the content provider 1 202 may transmit supplemental instructions specifying for the content receiver to record television programming aired by the fourth of the major television networks between the hours of seven PM and ten PM mountain time from a terrestrial broadcast source. Thus, subsequent to executing the instructions and the supplemental instructions, the content receiver may store all of the television programs broadcast by the four major television networks between the hours of seven PM and ten PM mountain time.

In a second example, the content provider 1 202 may instruct the content receiver 201 to automatically record multiple instances of content, included in the same frequency band of a broadcast, corresponding to television programs broadcast by the four major television networks between the hours of seven PM and ten PM mountain time. The content provider 1 202 may desire to also include television programs associated with a subchannel corresponding to one of the major four television networks for the above time period, but the content provider 1 202 may not have access to television programs associated with the subchannel. As such, the content provider 1 202 may transmit supplemental instructions specifying for the content receiver to record television programming aired associated with the subchannel during the time period mentioned above from a source where such television programs are available, such as a terrestrial broadcast source or an Internet source. Thus, subsequent to executing the instructions and the supplemental instructions, the content receiver may store the television programs broadcast by the four major television networks between the hours of seven PM and ten PM mountain time as well as the television programs associated with the subchannel for the same time period.

In a third example, the content provider 1 202 may instruct the content receiver 201 to automatically record multiple instances of content, included in the same frequency band of a broadcast, corresponding to television programs broadcast the four major television networks between the hours of seven PM and ten PM mountain time. However, the versions of the multiple instances of content available via the content provider 1 202 may have a lower resolution than the versions of the same instances of content available via another source, such as a terrestrial broadcast source and/or an Internet source (which may be the content provider 2 204). As such, the content provider 1 202 may transmit supplemental instructions specifying for the content receiver to record one or more versions of the multiple instances of content from the other source. The supplemental instructions in this example may be transmitted in response to one or more user requests received via the user interface component 210 of the content receiver.

As such, after executing the instructions and the supplemental instructions, the content receiver 201 may store the versions of the multiple instances of content recorded from the content provider 1 202 as well as one or more higher resolution versions of the multiple instances of content available from the other source. In some cases, the content receiver may overwrite one or more of the multiple instances of content recorded from the content provider 1 202 for which corresponding versions are recorded from the other source with the corresponding other version and/or otherwise delete the version recorded from the content provider 1 202.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A television receiver comprising:
one or more tuners;
a communication component;
one or more processors; and
a memory communicatively coupled with and readable by the one or more processors and having stored therein processor-readable instructions which, when executed by the one or more processors, cause the one or more processors to:
receive a plurality of instances of content via the one or more tuners broadcast by a first content provider;
record the plurality of instances of content received via the one or more tuners from the first content provider;
receive, from the first content provider, an instruction to record a supplemental content instance available as offline content; and
record, via the communication component, the supplemental content instance available as offline content in accordance with the instruction, wherein the one or more tuners receive the plurality of instances of content via a first communication link and the communication component receives the supplemental content instance via a second communication link distinct from the first communication link.

2. The television receiver of claim 1, wherein the processor-readable instructions that, when executed, cause the one or more processors to receive, from the first content provider, the instruction to record the supplemental content instance available as offline content comprise processor-readable instructions which, when executed, cause the one or more processors to receive the instruction as part of a transponder stream received via the one or more tuners broadcast by the first content provider.

3. The television receiver of claim 2, wherein the communication component communicates using an Internet protocol link and the second communication link is Internet-based.

4. The television receiver of claim 3, wherein the one or more tuners are configured to receive satellite communications and the first communication link is a satellite-based communication link.

5. The television receiver of claim 3, wherein the processor-readable instructions that, when executed, cause the one or more processors to record the supplemental content instance available as offline content in accordance with the instruction comprise processor-readable instructions which, when executed, cause the one or more processors to obtain the supplemental content instance from a second content provider distinct from the first content provider.

6. The television receiver of claim 1, wherein the processor-readable instructions, when executed, further cause the one or more processors to receive user input indicative of the supplemental content instance available as offline content, and wherein the processor-readable instructions that, when executed, cause the one or more processors to record, via the communication component, the supplemental content instance available as offline content in accordance with the instruction is further in accordance with the user input.

7. The television receiver of claim 1, wherein the processor-readable instructions which, when executed by the one or more processors, further cause the one or more processors to:
delete a recorded content instance of the plurality of recorded content instances after the supplemental content instance has been recorded, wherein the recorded content instance and the recorded supplemental content instance are different instances of a same piece of content.

8. The television receiver of claim 1, wherein the processor readable instructions which, when executed by the one or more processors, cause the one or more processors to record, based on the one or more supplemental instructions, the supplemental content instance via the second communication link comprise processor-readable instructions which, when executed, cause the one or more processors to perform recording of the supplemental content instance contingent on the content instance failing to be properly recorded.

9. The television receiver of claim 1, wherein the processor readable instructions which, when executed by the one or more processors, cause the one or more processors to receive the plurality of instances of content via the one or more tuners broadcast by the first content provider comprise processor-readable instructions which, when executed, cause the one or more processors to receive the plurality of instances of content over a same time period as part of a single transponder stream received by a single tuner of the one or more tuners of the television receiver.

10. A method for recording content, the method comprising:
receiving, by a television receiver, a plurality of instances of content, via one or more tuners, broadcast by a first content provider;
recording, by the television receiver, the plurality of instances of content received via the one or more tuners from the first content provider;
receiving, by the television receiver, from the first content provider, an instruction to record a supplemental content instance available as offline content; and
obtaining, by the television receiver, via a communication component, the supplemental content instance available as offline content in accordance with the instruction, wherein the one or more tuners receive the plurality of instances of content via a first communication link and the communication component receives the supplemental content instance via a second communication link distinct from the first communication link.

11. The method of claim 10, wherein receiving, from the first content provider, the instruction to record the supplemental content instance available as offline content comprises receiving the instruction as part of a transponder stream received via the one or more tuners broadcast by the first content provider.

12. The method of claim 11, further comprising receiving, by the television receiver, the supplemental content instance from an Internet source via the communication component wherein the second communication link is Internet-based.

13. The method of claim 12, wherein receiving the plurality of instance of content comprises receiving, by the television receiver, satellite-based communications via the one or more tuners and the first communication link is a satellite-based communication link.

14. The method of claim 12, wherein obtaining, by the television receiver, the supplemental content instance available as offline content in accordance with the instruction comprise obtaining the supplemental content instance from a second content provider distinct from the first content provider.

15. The method of claim 10, further comprising receiving, by the television receiver, user input indicative of the supplemental content instance available as offline content, and obtaining the supplemental content instance available as offline content in accordance with the instruction is further in accordance with the received user input.

16. The method of claim 10, further comprising:
deleting, by the television receiver, a recorded content instance of the plurality of recorded content instances after the supplemental content instance has been recorded, wherein the recorded content instance and the recorded supplemental content instance are different instances of a same piece of content.

17. The method of claim 10, wherein obtaining, based on the one or more supplemental instructions, the supplemental content instance via the second communication link further is contingent on the content instance failing to be properly recorded.

18. The method of claim 10, wherein receiving the plurality of instances of content via the one or more tuners broadcast by the first content provider comprises receiving the plurality of instances of content over a same time period as part of a single transponder stream received by a single tuner of the one or more tuners of the television receiver.

19. A non-transitory processor-readable medium comprising instructions that when executed cause one or more processors to:
receive a plurality of instances of content via one or more tuners broadcast by a first content provider;
record the plurality of instances of content received via the one or more tuners from the first content provider;
receive, from the first content provider, an instruction to record a supplemental content instance available as offline content; and
record, via a communication component, the supplemental content instance available as offline content in accordance with the instruction, wherein the one or more tuners receive the plurality of instances of content via a first communication link and the communication component receives the supplemental content instance via a second communication link distinct from the first communication link.

20. The non-transitory processor-readable medium of claim 19, wherein the processor-readable instructions that, when executed, cause the one or more processors to receive, from the first content provider, the instruction to record the supplemental content instance available as offline content comprise processor-readable instructions which, when executed, cause the one or more processors to receive the instruction as part of a transponder stream received via the one or more tuners broadcast by the first content provider.

* * * * *